US008983849B2

(12) United States Patent  
Phillips et al.

(10) Patent No.: US 8,983,849 B2  
(45) Date of Patent: Mar. 17, 2015

(54) MULTIPLE DEVICE INTELLIGENT LANGUAGE MODEL SYNCHRONIZATION

(71) Applicant: Nuance Communications, Inc., Burlington, MA (US)

(72) Inventors: Andrew Phillips, Durham, NC (US); David Kay, Seattle, WA (US); Erland Unruh, Seattle, WA (US); Eric Jun Fu, Bellevue, WA (US)

(73) Assignee: Nuance Communications, Inc., Burlington, MA (US)

( * ) Notice: Subject to any disclaimer, the term of this patent is extended or adjusted under 35 U.S.C. 154(b) by 42 days.

(21) Appl. No.: 13/834,575

(22) Filed: Mar. 15, 2013

(65) Prior Publication Data

US 2014/0108003 A1 Apr. 17, 2014

Related U.S. Application Data

(60) Provisional application No. 61/715,186, filed on Oct. 17, 2012.

(51) Int. Cl.
*G10L 15/22* (2006.01)
*G06F 17/28* (2006.01)
*G06F 17/30* (2006.01)
*G10L 15/183* (2013.01)

(52) U.S. Cl.
CPC .............. *G06F 17/289* (2013.01); *G10L 15/22* (2013.01); *G06F 17/30578* (2013.01); *G10L 15/183* (2013.01)
USPC ........................................................ 704/276

(58) Field of Classification Search
USPC ................. 704/270, 270.1, 275, 276
See application file for complete search history.

(56) References Cited

U.S. PATENT DOCUMENTS

| 5,566,229 | A | 10/1996 | Hou et al. |
| 5,677,989 | A | 10/1997 | Rabin et al. |
| 6,263,313 | B1 | 7/2001 | Milsted et al. |
| 6,606,596 | B1 | 8/2003 | Zirngibl et al. |
| 6,623,529 | B1 * | 9/2003 | Lakritz ......................... 715/205 |
| 7,137,126 | B1 | 11/2006 | Coffman et al. |
| 7,228,275 | B1 * | 6/2007 | Endo et al. .................... 704/235 |
| 7,313,528 | B1 | 12/2007 | Miller |
| 8,140,336 | B2 | 3/2012 | Saffer |
| 2002/0062212 | A1 * | 5/2002 | Nakatsuka .................... 704/240 |

(Continued)

OTHER PUBLICATIONS

International Search Report and Written Opinion for International App. No. PCT/US2013/065318, Applicant: Nuance Communications Inc., Mail Date: Feb. 7, 2014, 13 pages.

*Primary Examiner* — Michael N Opsasnick
(74) *Attorney, Agent, or Firm* — Perkins Coie LLP (57) ABSTRACT

Systems and methods for intelligent language models that can be used across multiple devices are provided. Some embodiments provide for a client-server system for integrating change events from each device running a local language processing system into a master language model. The change events can be integrated, not only into the master model, but also into each of the other local language models. As a result, some embodiments enable restoration to new devices as well as synchronization of usage across multiple devices. In addition, real-time messaging can be used on selected messages to ensure that high priority change events are updated quickly across all active devices. Using a subscription model driven by a server infrastructure, utilization logic on the client side can also drive selective language model updates.

20 Claims, 8 Drawing Sheets

(56) References Cited

U.S. PATENT DOCUMENTS

| | | | |
|---|---|---|---|
| 2002/0065656 A1* | 5/2002 | Reding et al. | 704/244 |
| 2002/0169777 A1* | 11/2002 | Balajel et al. | 707/10 |
| 2003/0023420 A1 | 1/2003 | Goodman | |
| 2003/0151633 A1 | 8/2003 | George et al. | |
| 2003/0169724 A1 | 9/2003 | Mehta et al. | |
| 2003/0182131 A1* | 9/2003 | Arnold et al. | 704/275 |
| 2003/0220791 A1* | 11/2003 | Toyama | 704/256 |
| 2004/0044516 A1 | 3/2004 | Kennewick et al. | |
| 2005/0049854 A1* | 3/2005 | Reding et al. | 704/201 |
| 2005/0119897 A1 | 6/2005 | Bennett et al. | |
| 2005/0158100 A1* | 7/2005 | Yamaguchi et al. | 400/62 |
| 2005/0193370 A1* | 9/2005 | Goring et al. | 717/115 |
| 2006/0007118 A1 | 1/2006 | Fux et al. | |
| 2006/0112182 A1 | 5/2006 | Chen et al. | |
| 2006/0122840 A1 | 6/2006 | Anderson et al. | |
| 2007/0083374 A1 | 4/2007 | Bates et al. | |
| 2007/0156618 A1 | 7/2007 | Meurs | |
| 2007/0233487 A1 | 10/2007 | Cohen et al. | |
| 2008/0091406 A1 | 4/2008 | Baldwin et al. | |
| 2008/0133228 A1 | 6/2008 | Rao | |
| 2008/0221898 A1* | 9/2008 | Cerra et al. | 704/270.1 |
| 2008/0288252 A1* | 11/2008 | Cerra et al. | 704/244 |
| 2009/0007001 A1 | 1/2009 | Morin et al. | |
| 2009/0024392 A1 | 1/2009 | Koshinaka | |
| 2009/0030684 A1* | 1/2009 | Cerra et al. | 704/236 |
| 2010/0057443 A1 | 3/2010 | Di Cristo et al. | |
| 2010/0153113 A1 | 6/2010 | Kiefer et al. | |
| 2010/0267345 A1 | 10/2010 | Berton et al. | |
| 2011/0145320 A1 | 6/2011 | Megginson | |
| 2011/0197227 A1 | 8/2011 | Rouse et al. | |
| 2012/0131139 A1 | 5/2012 | Siripurapu et al. | |
| 2012/0324391 A1 | 12/2012 | Tocci | |
| 2013/0198115 A1 | 8/2013 | Paek et al. | |
| 2014/0108994 A1 | 4/2014 | Medlock et al. | |

\* cited by examiner

| | | | | |
|---|---|---|---|---|
| Joe | Joe_0001<br>Joe_0002 | 3.4<br>4.5 | Seattle, WA<br>Denver, CO | English<br>English | Seattle Streets<br>Engineering Terms |
| Sarah | Sarah_0001<br>Sarah_0002<br>Sarah_0003 | 8.2<br>7.9<br>8.2 | Lexington, KY<br>Lexington, KY<br>Lexington, KY | English<br>English<br>English | Medical Terms<br>None<br>Olympic Sports |
| Bob | Bob_0001<br>Bob_0002<br>Bob_0003 | 1.2<br>1.2<br>1.2 | Los Angeles, CA<br>Pasadena, CA<br>Pasadena, CA | Russian<br>Russian<br>English | Russian History<br>Physics<br>CA Streets |
| ••• | ••• | ••• | ••• | ••• | ••• |

MULTIPLE DEVICE INTELLIGENT LANGUAGE MODEL SYNCHRONIZATION

CROSS-REFERENCE TO RELATED APPLICATIONS

This application claims the benefit of U.S. Provisional Application No. 61/715,186, filed on Oct. 17, 2012, entitled "MULTIPLE DEVICE INTELLIGENT LANGUAGE MODELS" which is hereby incorporated by reference for all purposes in its entirety.

BACKGROUND

There are a wide variety of language recognition systems that are designed to use one or more input modes. Typically, these input modes include a text input mode, speech input mode, and/or handwriting input mode. One of the fundamental objectives underlying these language recognition systems is to enable users to create text using one or more input modes with increased reliability at increased rates. The text input mode, for example, often allows increased input rates by enabling the user to perform actions with less precision than is required by comparable systems. In addition, this mode often provides a predicative completion feature that suggests word completion. The voice and handwriting input modes utilize a different set of input actions that some users may find easier and faster than typing. These inputs are then translated to text.

In general, language recognition systems rely upon local language models with a lexicon of textual objects that can be generated by the system based on the input actions performed by the user. However, since each user is different, these language models dynamically evolve in different ways based on each user's interactions. Moreover, the users of the language recognition systems often have multiple devices on which to use the language recognition systems. This results in the users having to independently train a language model for each device. As such, techniques are needed that provide language models that can be used across multiple devices.

BRIEF DESCRIPTION OF THE DRAWINGS

Embodiments of the present invention will be described and explained through the use of the accompanying drawings in which.

The drawings have not necessarily been drawn to scale. For example, the relative sizes of signaling periods in the figures are not to scale, and the size of certain signaling or messaging periods may differ. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the disclosed language processing system and methods generally relate to user entry of information into a system with an input device. In particular, some embodiments provide for intelligent language models that can be used across multiple devices. Traditional language recognition systems rely upon local language models with a lexicon of textual objects that can be generated by the system. In some cases, the devices running the language recognition system uses the language models to map input actions performed by the user to one or more of these textual objects in the lexicon. These models are often dynamic and grow and learn as they are used, allowing a user to improve the baseline prediction with usage and teaching.

With the proliferation of computing devices, it is not uncommon for users to have multiple devices and, as a result, have multiple local language models. With traditional language recognition systems, each device would need to individually learn or develop a customized local language model based on user inputs with each device. Moreover, a number of variables affect the accuracy with which these language recognition systems recognize and map the inputs to the textual objects. Prominent among these factors is whether the textual object resides within the lexicon and the frequency of use of the textual object. For example, if a word is not frequently used, a text input system might misrecognize the word, favoring one that is statistically more likely to be utilized. Among the words that are commonly misrecognized are proper names, such as those for people, streets, restaurants, and other words that have a special relevance in personal messages like voicemails. As a result, the language model in any one device may have a less than desirable response because the language model has not been trained with all of the user's inputs.

In contrast, the language processing systems and methods disclosed herein create a master language model, synchronize changes from an individual device's model with the master language model, and synchronize the change from the master language model to the other devices associated with the user. The master language model may be stored "in the cloud," such as in a remote server or other device. Maintaining a master language model allows a user to create a custom language model that moves with the user between devices, as well as keeps multiple devices synchronized. In addition, the use of a master language model enables new devices to adopt the most current language model. In some embodiments, a server-based subscription model for language updates can be utilized by a client running on a user's device, which determines the most optimal update scheduling for language models maintained in each local device.

Under some situations (e.g., due to connection type or heavy usage), it may be impractical to consistently synchronize events on a local device with the master language model. Various embodiments provide the ability to selectively deliver some events to the master language model in real-time (or near real-time) in order to improve immediate prediction on the other secondary devices. In at least one embodiment, a messaging system can be used to prioritize when to distribute events to local devices. For example, the messaging system can determined which events are of high importance and immediately enter that event into the language model. The messaging system can utilize a real-time (or near real-time) message bus between multiple clients and a server, or set of servers, enabling the ability to synchronize language model change events to enhance the input experience for a user across multiple devices.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. While, for convenience, embodiments of the present invention are described with reference to cloud-based master language models, embodiments of the present invention are equally applicable to various other networking paradigms where a master language model may reside.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present invention, and may be included in more than one implementation. In addition, such phrases do not necessarily refer to the same embodiments or different embodiments.

Figure 1:
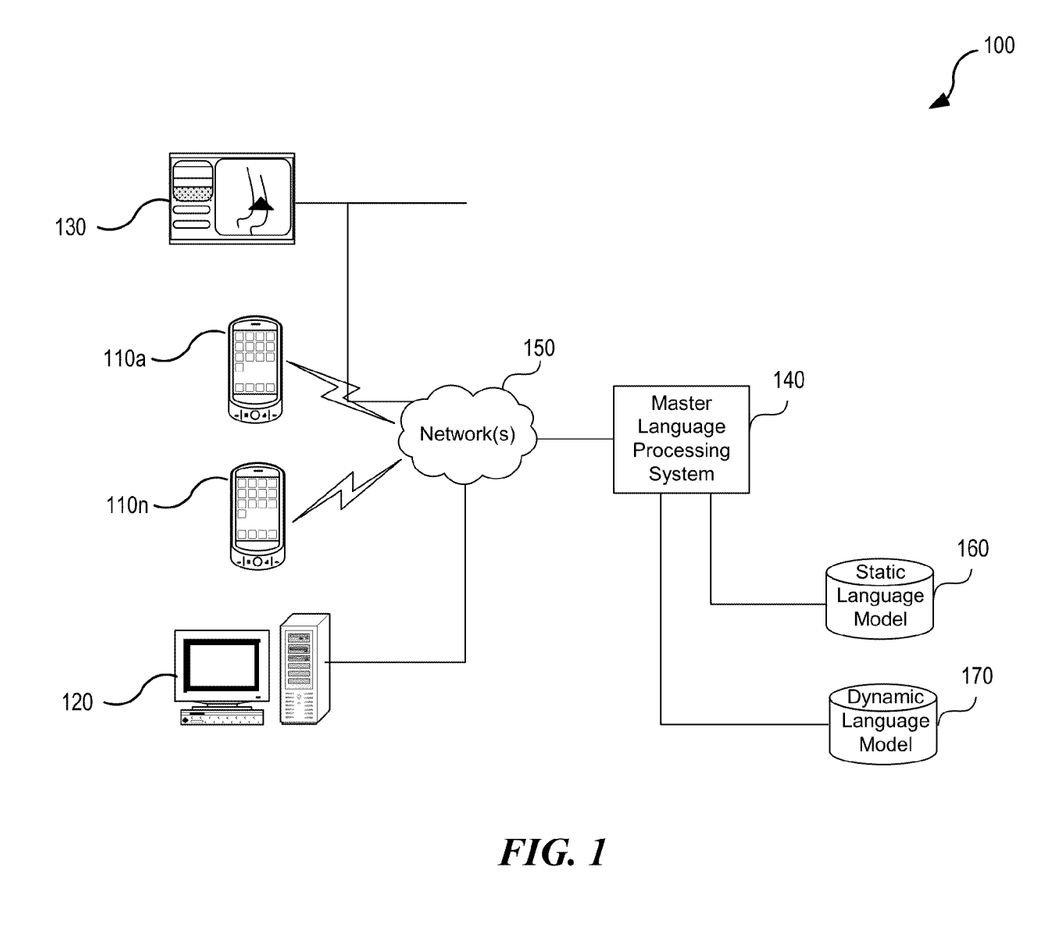
FIG. 1 illustrates an example of a computing environment in which some embodiments of the present invention may be utilized.

FIG. 1 illustrates an example of a computing environment 100 in which embodiments of the present invention may be utilized. As illustrated in FIG. 1, a language recognition system may be operating on one or more mobile devices 110a-n (such as a mobile phone, tablet computer, mobile media device, mobile gaming device, vehicle-based computer, etc.), one or more computing devices (such as computer 120), and other devices capable of receiving user inputs (e.g., such as navigation system 130). Each of these devices can include various input mechanisms (e.g., microphones, keypads, and/or touch screens) to receive user interactions (e.g., voice, text, and/or handwriting inputs). Each language recognition system on these devices can be running a local language model.

As illustrated in FIG. 1, these devices can communicate with master language processing system 140 through one or more wired or wireless, public or private, networks 150. In accordance with various embodiments of the present invention, master language processing system 140 builds a master language model by applying the changes received from multiple language models that are running locally on the mobile devices. As a result, the master language model is a model (i.e., a single model or a combination of multiple models) generated specifically for the end user from the interactions the end user has with each of the devices associated with the end user.

In accordance with various embodiments, the master language model may include multiple models such as static language model 160 and dynamic language model 170. Static language model 160 is a word list generated for a language based on general language use. In some embodiments, infrequently used words (e.g., dinosaur names or street names) can be added permanently or temporarily as a new partition or language model based on location or other triggering event. In contrast, dynamic language model 170 receives change events (e.g., add a word, delete a word, word corrections, n-grams, and word count) from each device associated with the end user. Change events are typically processed in the order that they occurred in order to update the dynamic language model (e.g., in real-time or near real-time). However, in some embodiments, change events can be processed out of order to update the dynamic language model. For example, more important change events may be prioritized for processing before less important change events.

Figure 2:
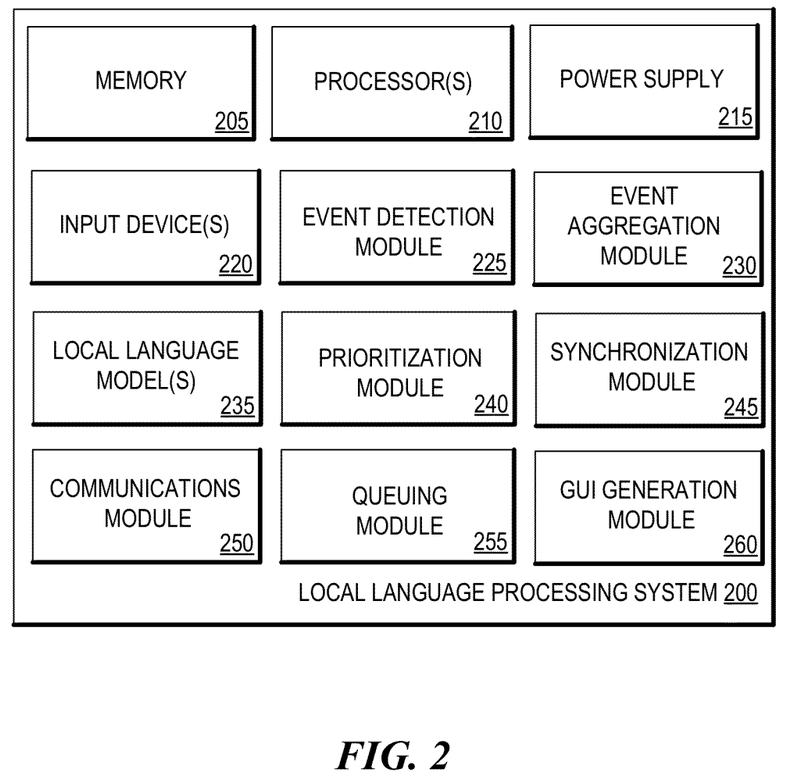
FIG. 2 illustrates a set of components for a local language processing system according to one or more embodiments of the present invention.

FIG. 2 illustrates a set of components for a local language processing system 200. According to the embodiments shown in FIG. 2, local language processing system 200 can include memory 205, one or more processors 210, power supply 215, input devices 220, event detection module 225, event aggregation module 230, local language models 235, prioritization module 240, synchronization module 245, communications module 250, queuing module 255, and graphical user interface (GUI) generation module 260. Other embodiments of the system may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, prioritization module 240 and queuing module 255 can be combined into a single module for prioritizing event data transfers.

Memory 205 can be any device, mechanism, or populated data structure used for storing information. In accordance with some embodiments of the present system, memory 205 can encompass any type of, but is not limited to, volatile memory, nonvolatile memory, and dynamic memory. For example, memory 205 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processors 210. For example, memory 205 could be used in one or more embodiments to house all or some of the instructions needed to execute the functionality of event detection module 225, event aggregation module 230, local language models 235, prioritization module 240, synchronization module 245, communications module 250, queuing module 255, and/or GUI generation module 260. Memory 205, processors 210, and other components (e.g., input devices 220) may be powered by power supply 215 (e.g., a battery or other power source).

Event detection module 225 can use one or more input devices 220 (e.g., keyboard, touchscreen, or microphone) to detect one or more change events associated with local language models running on each computing device 110-130. Change events arise as a result of a user's interaction with a language processing system on a local device. A change event can be used to modify the local language model. Some change events may have a large impact on the local language model (e.g., when adding a word), while other change events may have little to no effect (e.g., using a word which already has a high frequency count). Change events can include data points which can be used by the system to process changes which modify the language model. Examples of events that can be detected include new word events, delete word events, mark use events, mark nonuse events, adjust quality events, delete language events, new word pair events, new n-gram events, location events, and many other events that can be used for developing a dynamic language model. In some embodiments, the change events can also include additional data such as a weighting factor, a categorization indicator, location information, locale information (e.g., for determining dialects of language usage), and word usage information. The additional data may be derived from the user's interaction with the local device or may be automatically generated by the system.

In some cases, event aggregation module 230, can aggregate or categorize the events into a single grouping to allow communications module 250 to push the events to the master language processing system 140. In addition, any categorization, defined as a grouping of words or n-grams, enables customization of the language and complex model management. In at least one embodiment, language changes can be pushed down as a category, allowing different weights to each category as a whole. The ability to assign different weights to each category, for example, allows impact on the language models to be adjusted. In other embodiments, categories can be deleted, thus easily removing the word and n-gram set from the user's model without affecting the remaining model.

Local language models 235 can be associated with each device to locally process the user's inputs. These local language models only incorporate the events detected with the associated device. In some cases, the models may also access any local contact lists, local e-mails, local SMS/MMS texts, and other local text-based communications for developing the local language model.

Prioritization module 240 prioritizes the change events detected by event detection module 225. In some embodiments, the prioritization may be based on local contextual information such as network connections, current usage rates, power levels, or user preferences. Using information about the detected events and the priority of these detected events, synchronization module 245 can send the events individually, or in the aggregate, to master language processing system 140. In some embodiments, synchronization module 245 receives update instructions from master language processing system 140.

Communications module 250 sends and receives any updates to and from master language processing system 140. In some embodiments, communications module 250 monitors the current connection type (e.g., cellular or Wi-Fi_33) and can make a determination as to whether updates and events should be pushed or pulled. For example, if communications module 250 determines that a cellular connection is currently being used then any outgoing messages can be queued using queuing module 255. In addition to the current connection type, communications module may use other information such as event priority and/or user preferences when determining whether to push or pull data.

GUI generation module 260 generates one or more GUI screens that allow for interaction with a user of the language processing system. In at least one embodiment, GUI generation module 260 generates a graphical user interface allowing a user of the computing devices to set preferences, run training applications for training the language processing system, set device constraints, select temporary static language model additions, and/or otherwise receive or convey information between the user and the device.

Figure 3:
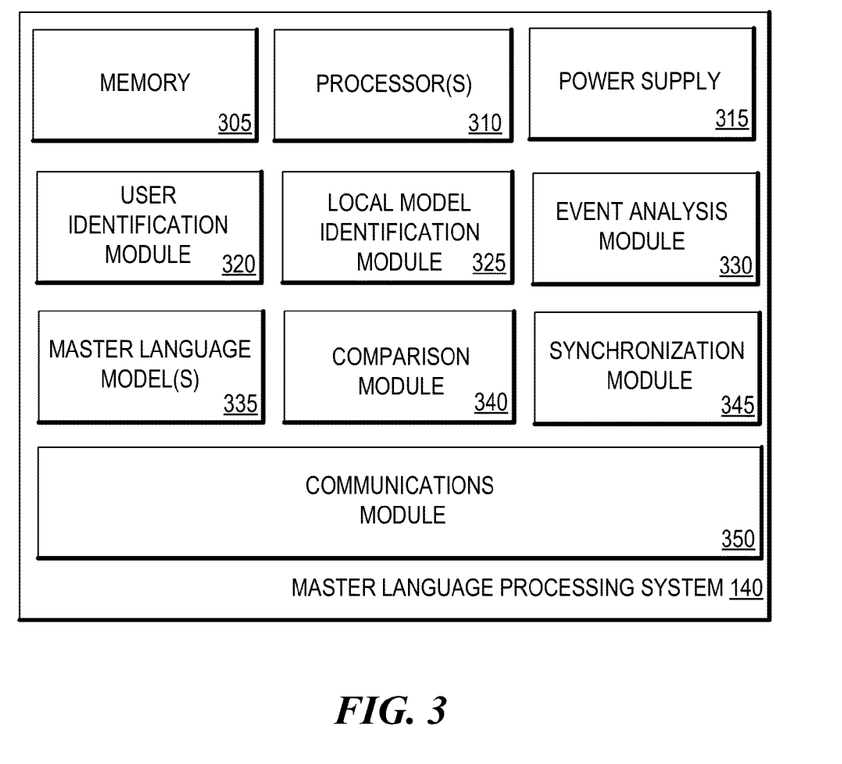
FIG. 3 illustrates a set of components for master language processing system according to various embodiments of the present invention.

FIG. 3 illustrates a set of components for master language processing system 140. According to the embodiments shown in FIG. 3, master language processing system 140 can include memory 305, one or more processors 310, power supply 315, user identification module 320, local model identification module 325, event analysis module 330, master language models 335, comparison module 340, synchronization module 345, and communications module 350. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, the functionality of user identification module 320 and local model identification module 325 may be incorporated into a single module.

Memory 305 can be any device, mechanism, or populated data structure used for storing information as describe above with reference to memory 205. Memory 305 may be used to store instructions for running one or more applications or modules on processors 310. For example, memory 305 could be used in one or more embodiments to house all or some of the instructions needed to execute the functionality of user identification module 320, local model identification module 325, event analysis module 330, master language models 335, comparison module 340, synchronization module 345, and/or communications module 350.

User identification module 320 can be configured to identify the user. In accordance with various embodiments, a variety of methods may be used such as, but not limited to, log in credentials, telecommunication device identifiers, voice identification, visual recognition, and/or other techniques for identifying users. The same or different identification methods may be used at each device to identify the user when the user accesses the language processing system. Each user is associated with multiple devices that have local language models. Local model identification module 325 can be used to track the current state of each model.

As events are received from the various local language models associated with an individual, event analysis module 330 determines how the events should be processed and applied (e.g., sequentially based on a time stamp or based on an assigned event priority) to the master language models 335. While some embodiments may notify users of inconsistencies, other embodiments, automatically handle the changes and manage the language model. In some cases, system resources such as disk space can be used in making decisions on how to process and apply the events and/or whether to retain lists of words. In some embodiments, the changes to the master language models 335 can be tracked using a change log in a SQL database. In other embodiments, the changes are stored in an on disk change log. In addition to the events received from the local devices, other off-board personal data, such as website data, social networking data, social networking friend data (such as communications with friends), information from personal computing devices, data from Internet accessible documents (e.g., Google docs), and others may be utilized in building the master language models.

Comparison module 340 determines the current state of any of the user's local language models as compared to the current master language models. Using the state information that is determined by comparison module 340, information synchronization module 345 can determine whether to send updates (e.g., in batches) using communications module 350 or request that an entire local language model be replaced.

Figure 4:
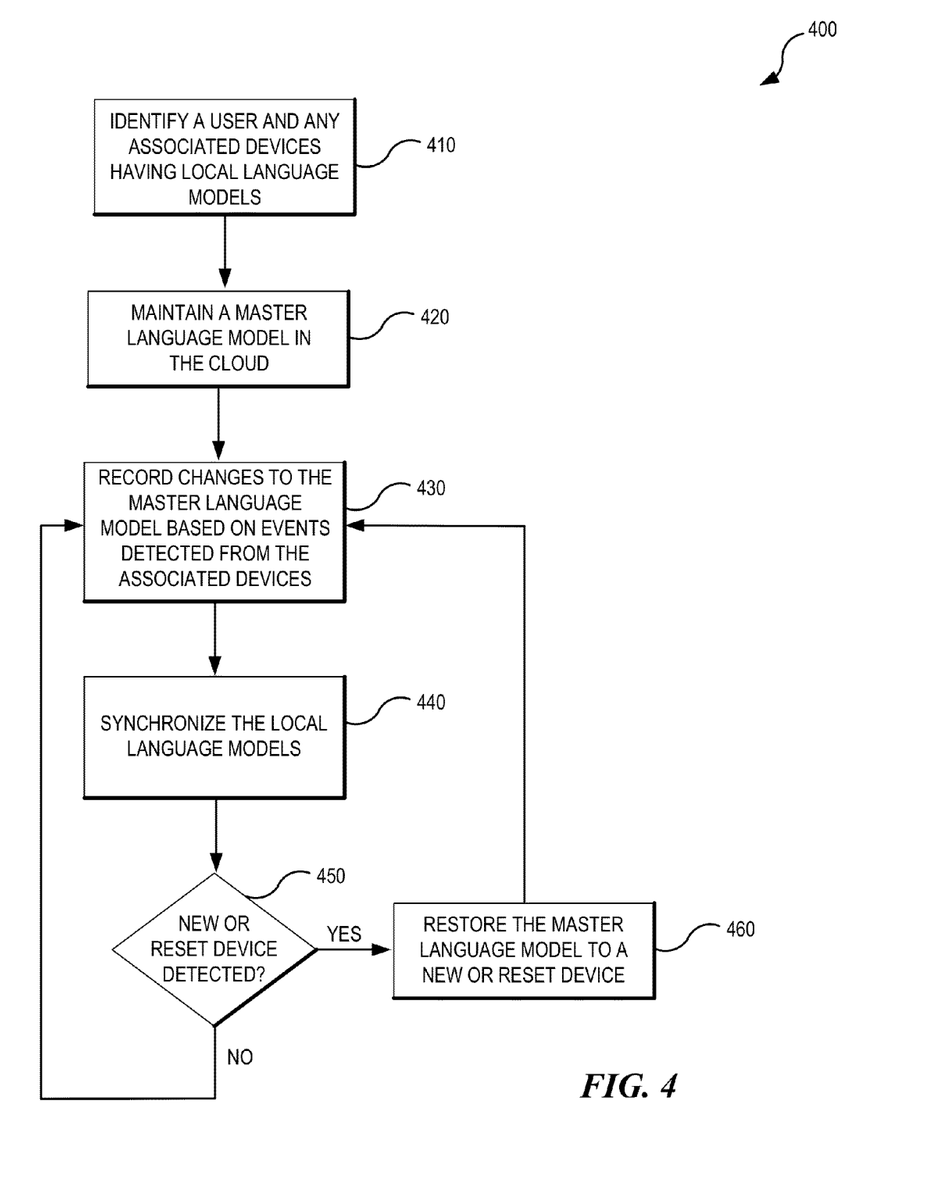
FIG. 4 is a flowchart illustrating a set of operations for synchronizing local language models based on a master language model in accordance with one or more embodiments of the present invention.

FIG. 4 is a flowchart illustrating a set of operations 400 for synchronizing local language models based on a master language model. In accordance with various embodiments, the operations illustrated in FIG. 4 may be performed by one or more components (e.g., processor 310) and/or modules (e.g., user identification module 320 or synchronization module 345). Identification operation 410 identifies a user and any associated devices that have local language models. Maintaining operation 420 builds and maintains master language models based on events recorded from the local language models identified in identification operation 410. The master language models are typically maintained in a cloud-based environment or other distributed server-client system.

Recordation operation 430 records any changes to the master language model based on changes such as new words, removed words, n-grams, and word/n-gram weights received from the associated user devices. Using synchronization operation 440, the various local models on the user devices can be synchronized. Language model synchronization enables an end user to use multiple devices and have the usage of each of those devices affect both the master model and the models on the other devices. Tablets, phones, televisions, and cars all include textual input that could take advantage of synchronization of language models. The end result is a better experience because a user's usage of one device affects the prediction the user will receive on another device.

Determination operation 450 determines whether new or reset devices have been detected. If so, determination operation 450 branches to restoration operation 460 where the entire master language model is provided to the new or reset device as a local language model. Any changes or events detected by this, or any other local language model, are used to update the master language model. If determination operation 450 determines that no new or reset device has been detected, the determination operation branches to recordation operation 430 where any changes to the master language model are recorded.

Consider the following example for applying the master language model to a new device. Suppose a user has been using a language processing system which allows the user to back up and synchronize a language model across multiple devices. The user uses the language processing system on an old mobile phone but purchases a new mobile phone. When the user launches language processing system on the new device, it asks for a set of login credentials. Once the user is logged into the existing language processing system account (or other identifying account, such as Facebook™), the local language processing system connects to the master language processing system and loads the master dynamic language model, which includes all usage from the old phone. As a result, the local language processing system retrieves all of the changes and incorporates them into the new device. As a result, when the user starts typing, the language model on the new phone makes predictions based on previous usage, and the user is provided with a better experience.

Consider the following example for synchronizing multiple devices in accordance with various embodiments of the preset invention: suppose a user purchases a new tablet to go with the user's mobile phone. The user's account is accessed and the local language model is synchronized with the master language model residing in the cloud. In some embodiments, the cloud or cloud infrastructure is just a server based system that can be distributed. As the user starts using the tablet to write emails, new words that are commonly used in the current region are loaded, as well as some new phrases. Then, when the user picks up the mobile phone and types a few characters of a recently loaded new word, the word shows up in her word choice list. If the user selects the word, the next word in the new phrase is given as a prediction option in the user's word choice list.

One advantage of various embodiments of the present invention is the ability to allow a user to keep a language model across multiple devices and keep it up to date over time. This enables users to purchase a new device and pick up where they left off, as well as keep word use consistent across multiple devices. Various embodiments of the present invention also enable this information to be used to improve default, or shared, language models by allowing methods of analysis of actual user language models across multiple devices.

Figure 5:
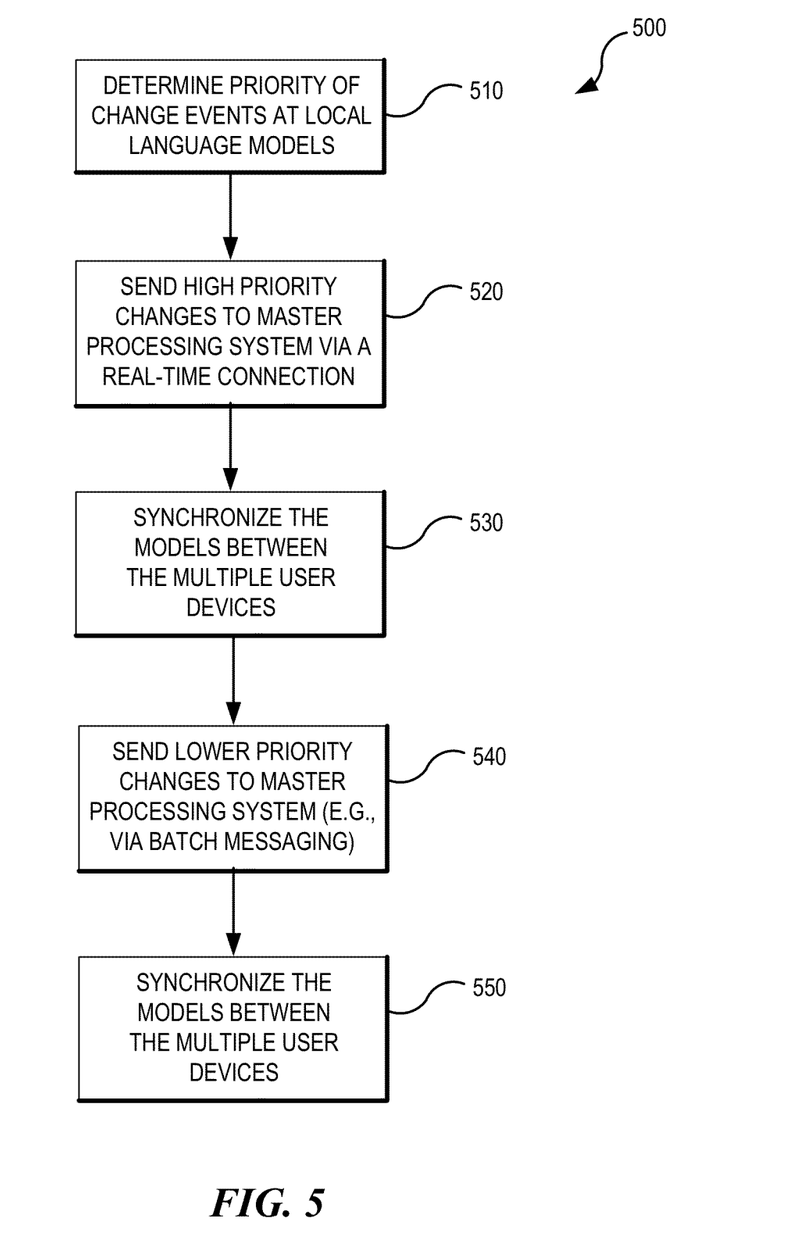
FIG. 5 is a flowchart illustrating a set of operations for utilizing a high priority messaging system in accordance with various embodiments of the present invention.

Various embodiments of the present invention may provide for a messaging system to synchronize change events that are determined to be of high importance between multiple devices. FIG. 5 illustrates a set of operations 500 for utilizing a high priority messaging system in accordance with various embodiments of the present invention. Priority determination operation 510 determines the priority of change events at a local language model. High priority change events (e.g., new words and n-grams added to the language model) are immediately sent to the master processing system via a real-time connection (e.g., TCP connection) in high priority sending operation 520. In some embodiments, events that significantly affect the weight of a word in a prediction engine could be determined to be high priority.

The master processing system updates the master language model with these change events and pushes the changes to the local language models during synchronization operation 530. Lower priority change events are sent to the master processing system (e.g., via batch messaging) at a later time using low priority sending operation 540. The master processing system updates the master language model with these change events and pushes the changes to the local language models during synchronization operation 550.

In some embodiments, the master processing system can consolidate language model changes both from a single device and from multiple devices. For example, if there are three devices synchronizing, the master model can consolidate a set of changes from the first and second devices for the third device. In some cases, the system can combine and/or aggregate common events as well as drop events that are no longer are applicable based on usage and/or time. The same priority may be applied to all change events in some embodiments. While in other embodiments, each event, or groups of events, can have different priorities. The local devices can use the event priority to create updates based upon multiple considerations (for example network availability) and transmit the events based upon priority or in larger blocks. The master processing system can then process the events and send them down to the other devices.

Consider the following real-time synchronization example: suppose a user has a phone and tablet both with the latest version of the language processing system that has the ability to synchronize words in real-time. The user is writing an email to some friends on a tablet about his new favorite show, Battlestar Galactica. Battlestar is not part of the user's language model and thus the user has to type it in completely, along with the unrecognized word Galactica. The system detects the add word event and generates a message to send across the message system to the server. The server detects that the phone is also active and sends the event down to the user's phone. After the user finishes the email, he immediately receives a text from one of his friends on his phone, wanting to chat about Battlestar Galactica. The user picks up his phone to begin writing a response and when he begins typing Battlestar he notices that the system predicts it immediately, removing his need to type it in.

Some embodiments of the present invention also provide for a language processing system whereby a server-based subscription model for language updates utilized by a client. In at least one embodiment, the clients can determine the most optimal update scheduling using device level factors such as connection status (e.g., cellular or Wi-Fi) and/or user preferences. For example, more frequent updates can be applied if a determination is made that a high quality and free data pipe is available. Similarly, if there is only a low quality (e.g., constantly dropping, or EDGE) the system might delay synchronization of large data sets. In addition, for the high priority events where a good connection changes can be sent in real time the updates may occur more frequently, while a poor connection might result in the system either batching or dropping the events. In accordance with some embodiments, a device can be notified of a list of possible language model enhancements (e.g., dinosaur or street names), which are either manually or automatically subscribed to and then integrated into the local language models.

Figure 6:
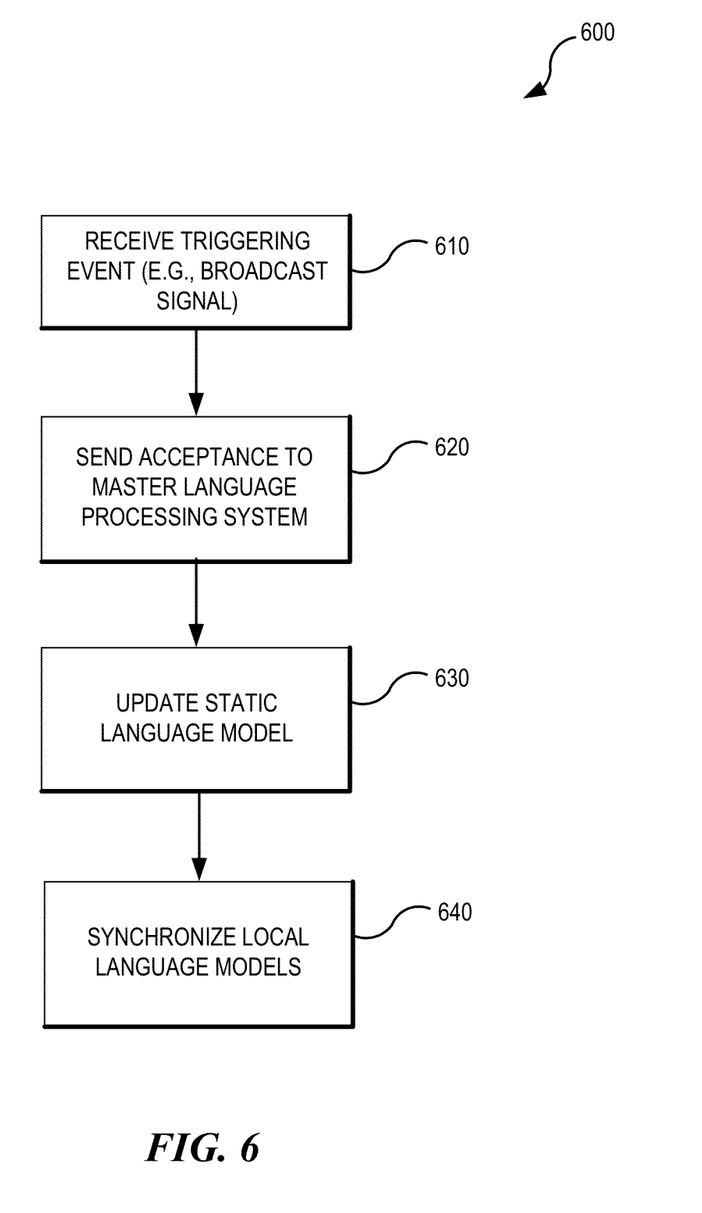
FIG. 6 is a flowchart illustrating a set of operations for integrating server-based subscription models in accordance with one or more embodiments of the present invention.

FIG. 6 is a flowchart illustrating a set of operations 600 for integrating server-based subscription models in accordance with one or more embodiments of the present invention. As illustrated in FIG. 6, receiving operation 610 receives a triggering event for updating a language model by adding (possibly temporarily) additional words. In some embodiments, the triggering event can be a broadcast signal indicating a set of additional words. For example, an exhibit in a museum may broadcast a signal identifying a common set of words for the exhibit the user has just entered. Other examples of triggering events can include a user scanning a 1-D or 2-D barcode (e.g., on a sign, advertisement, or magazine) or a GPS location. The updates can be automatically or manually accepted. Then, sending operation 620 sends the acceptance to the master language processing system where the word list is added to the master language model during update operation 630. The local model on the user's device is then updated using synchronization operation 640.

In some embodiments, the local language processing system (i.e., the client running on the end user's device) can use current language utilization to determine which models to update. In this case, language-based updates can be made available to the client from the server-based system (i.e., the master language processing system), and the client would use the active languages to determine if the update should be fetched. One benefit is that the enhancements are only downloaded for the languages the user is actively using, even though the user may have used other languages that have updates. When a user switches languages the system would determine if the server notified the device of updates for that language and process any updates.

Consider the following example, where a user's phone retrieves a list of subscriptions available from the server. The local language processing system detects that the user is currently using English and is in the US locale. The client determines all of the appropriate English subscriptions available and subscribes to them. The client downloads the current updates for the user's device. As a result, the user finds that the device now predicts the name of his favorite musician that it did not before. When the user switches to his native French, the client determines all of the appropriate French subscriptions available and subscribes to them. The next day the server notifies the clients of updates to the English and French models that it had subscribed to. Because the device is still set to French, the device updates the French subscriptions and marks the English subscriptions as available when the user switches back to English.

In some embodiments, location and/or crowd sourcing can be used to determine words or subscription packages for download. For example, when a user lands in Paris, the French subscription can be downloaded and/or activated. As an example of crowd sourcing, a determination can be made from those who are in your geographic location which packages should be downloaded and/or activated. Depending on the specific package restrictions such as distance and/or time may also be applied.

Various embodiments allow for different mechanisms for the management of the subscriptions. For example, in some cases, the end user can manage subscriptions either in the application or through a web based system. Various graphical user interfaces may be created which allow the user to select for manual or automatic updates and switching. The user may also be able to select between using crowd sourcing and/or geographic locations. In addition, the graphical user interface screens may accept payment information for any subscriptions which require payment.

In another embodiment, the system can utilize network conditions. For example, if the system detects that the user is currently on what it determines is either a poor or metered connection updates would not be processed. When the system determines the user is on either a higher quality and/or unmetered connection the system would update the appropriate enhancements.

Figure 7:
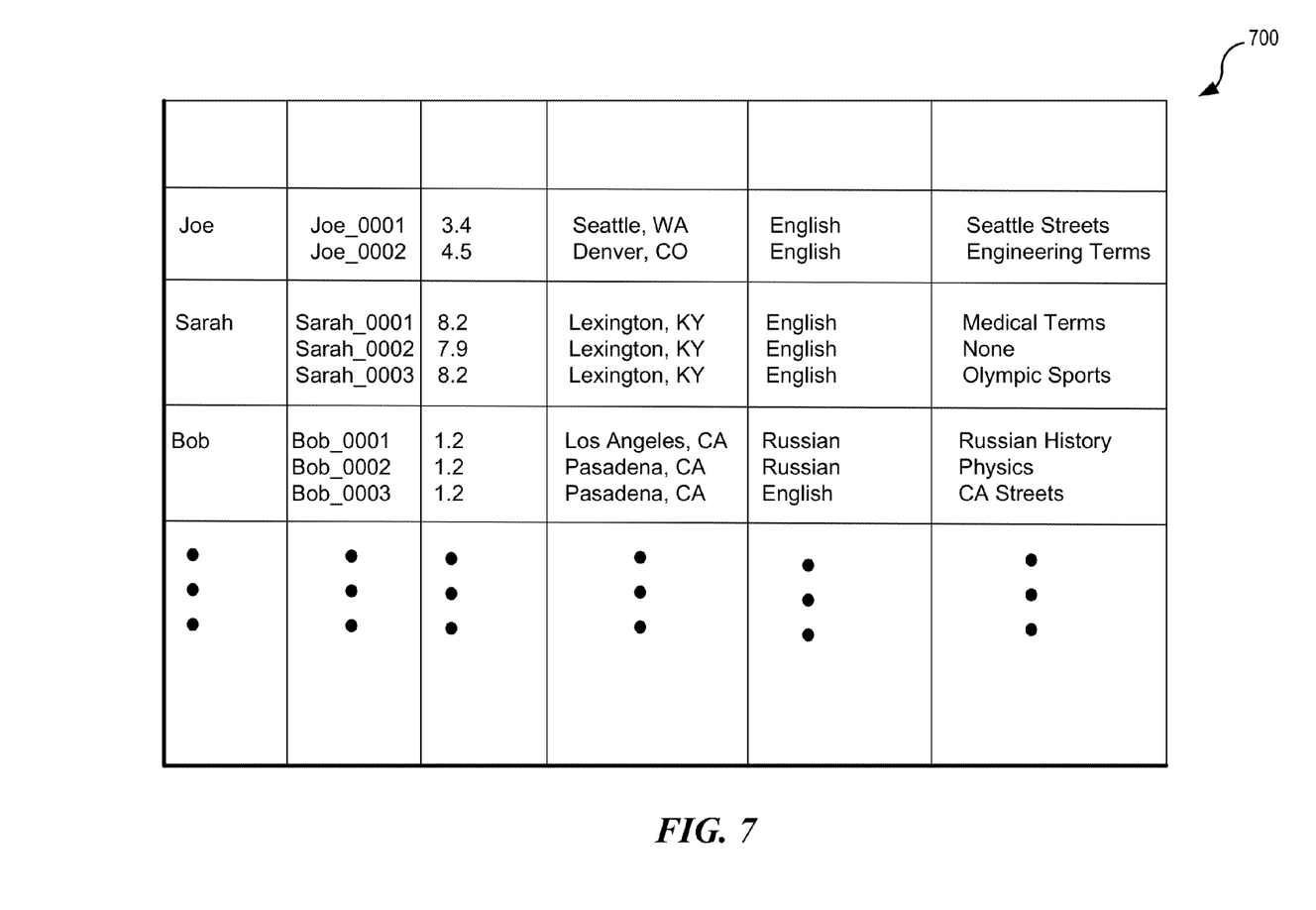
FIG. 7 illustrates a set of information that may be associated with each user in accordance with various embodiments of the present invention.

FIG. 7 illustrates a set of information 700 that may be associated with each user in accordance with various embodiments of the present invention. As illustrated in FIG. 7, a user record can include a user ID, a local ID, a local device version, current location, current language ID, and any temporary language models being utilized by the local language processing systems.

Exemplary Computer System Overview

Figure 8:
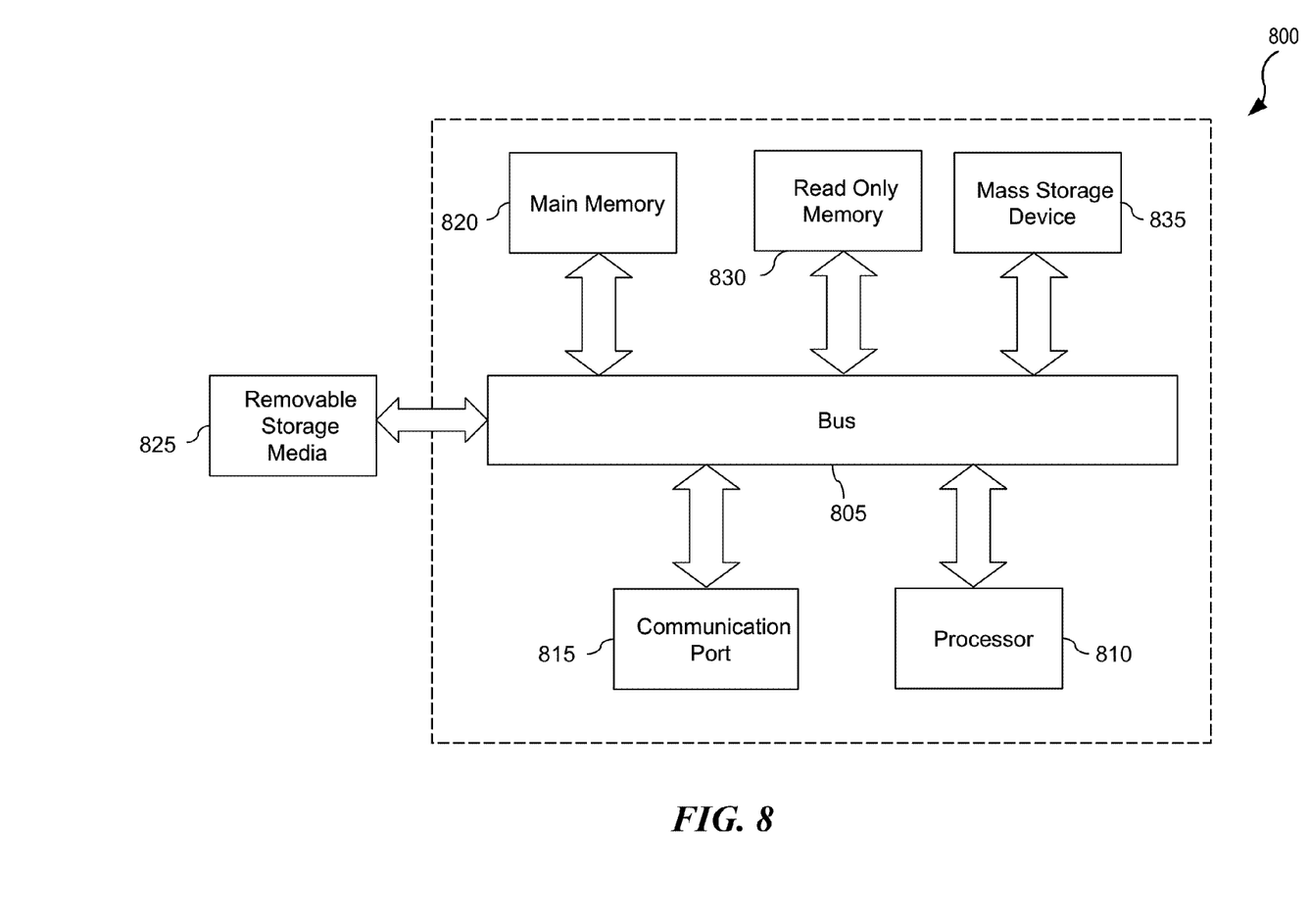
FIG. 8 is an example of a computer system with which embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present invention may be utilized. According to the present example, the computer system includes a bus 805, at least one processor 810, at least one communication port 815, a main memory 820, a removable storage media 825, a read only memory 830, and a mass storage 835.

Processor(s) 810 can be any known processor, such as, but not limited to, an Intel® Itanium® or Itanium 2® processor(s); AMD® Opteron® or Athlon MP® processor(s); or Motorola® lines of processors. Communication port(s) 815 can be any of an RS-232 port for use with a modem based dialup connection, a 10/100 Ethernet port, or a Gigabit port using copper or fiber. Communication port(s) 815 may be chosen depending on a network such a Local Area Network (LAN), Wide Area Network (WAN), or any network to which the computer system 800 connects.

Main memory 820 can be Random Access Memory (RAM), or any other dynamic storage device(s) commonly known in the art. Read only memory 830 can be any static storage device(s), such as Programmable Read Only Memory (PROM) chips for storing static information such as instructions for processor 810.

Mass storage 835 can be used to store information and instructions. For example, hard disks such as the Adaptec® family of SCSI drives, an optical disc, an array of disks such as RAID, such as the Adaptec family of RAID drives, or any other mass storage devices may be used.

Bus 805 communicatively couples processor(s) 810 with the other memory, storage, and communication blocks. Bus 805 can be a PCI/PCI-X or SCSI based system bus depending on the storage devices used.

Removable storage media 825 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

The components described above are meant to exemplify some types of possibilities. In no way should the aforementioned examples limit the scope of the invention, as they are only exemplary embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a computer-readable medium claim, other aspects may likewise be embodied as a computer-readable medium claim, or in other forms, such as being embodied in a means-plus-function claim. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. A method for operating a master language processing system, the method comprising:
  receiving, at the master language processing system, update messages from multiple local language processing systems,
    wherein the update messages include change events to local language models detected by the multiple local language processing systems;
  updating a master language model in the master language processing system based on the change events included in the update messages received from the multiple local language processing systems;

generating synchronization messages for each of the multiple local language processing systems to integrate change events from other local language processing systems; and transmitting the synchronization messages to each of the multiple local language processing systems, such that updates to the master language model are propagated to the local language models.

2. The method of claim 1, wherein each update message further includes a priority level reflecting the priority of change events in the update message.

3. The method of claim 2, wherein the update messages received at the master language processing system include groups of batched update messages having a low priority level from the multiple local language processing systems.

4. The method of claim 2, wherein the master language model is updated with any update messages having a high priority level before the master language model is updated with any update messages having a low priority level.

5. The method of claim 4, wherein each synchronization message further includes a priority level reflecting the priority of change events in the synchronization message.

6. The method of claim 5, wherein synchronization messages having a high priority level are generated immediately after the master language model is updated with each update message having the high priority level.

7. The method of claim 2, wherein the update messages are transmitted through different network connections depending on priority level.

8. The method of claim 1, wherein the master language model system is a server-based system and update messages are received via a network connection.

9. The method of claim 1, wherein the one or more change events include new words, removed words, n-grams, or word weights.

10. A computer-readable medium, excluding a transitory propagating signal, containing instructions that, when executed cause a computing system to:

receive, at a master language processing system, update messages from multiple local language processing systems associated with devices of a user, wherein each update message includes one or more change events to a local language model on a device, each of the change events having an associated priority;

update a master language model in the master language processing system based on the change events included in the update messages received from the multiple local language processing systems, wherein the master language model is updated in an order based on the priority associated with the change event;

generate synchronization messages for each of the multiple local language processing systems to integrate change events from other local language processing systems; and transmit the synchronization messages to each of the multiple local language processing systems such that updates to the master language model are propagated to the local language models on the devices of the user.

11. The computer-readable medium of claim 10, wherein each synchronization message further includes a priority level reflecting the priority of change events in the synchronization message.

12. The computer-readable medium of claim 11, wherein synchronization messages having a high priority level are generated immediately after the master language model is updated with each change message having a high priority level.

13. The computer-readable medium of claim 10, wherein the received one or more change events are categorized into groups of change events to allow the master language processor to process like events.

14. The computer-readable medium of claim 10, wherein the master language model includes a static language model and a dynamic language model.

15. A computer-implemented method for operating a local language processing system, the method comprising:

detecting, at a computing device running the local language processing system, one or more change events to a local language model, wherein the one or more change events reflect an update to the local language model such that the local language model is different from a master language model;

modifying the local language model based on the one or more change events that have been detected;

communicating the one or more change events to a master language processing system, the master language processing system using the one or more change events to update a master language model, wherein the master language processing system operates on a server-based computing system remote from the computing device.

16. The computer-implemented method of claim 15, further comprising receiving a synchronization message from the master language processing system, wherein the synchronization message includes changes to be incorporated in the local language model at the computing device based on event changes reported to the master language processing system by other local language processing systems on other computing devices.

17. The computer-implemented method of claim 15, wherein the local language processing system on the computing device and the other local language processing systems on other computing devices are associated with a common user.

18. The computer-implemented method of claim 15, wherein the one or more change events include new words, removed words, n-grams, or word weights.

19. The computer-implemented method of claim 15, further comprising:

determining whether the computing device is a new device associated with a user; and if the computing device is a new device, receiving change events to the local language model so that the local language model is synchronized with the master language model.

20. The computer-implemented method of claim 15, further comprising:

determining a priority level associated with each of the one or more change events;

initially sending to the master language processing system any of the one or more change events with a high priority level; and grouping any of the one or more change events with a low priority level into batches to be sent at a subsequent time to the master language processing system.

* * * * *